Figure 1:
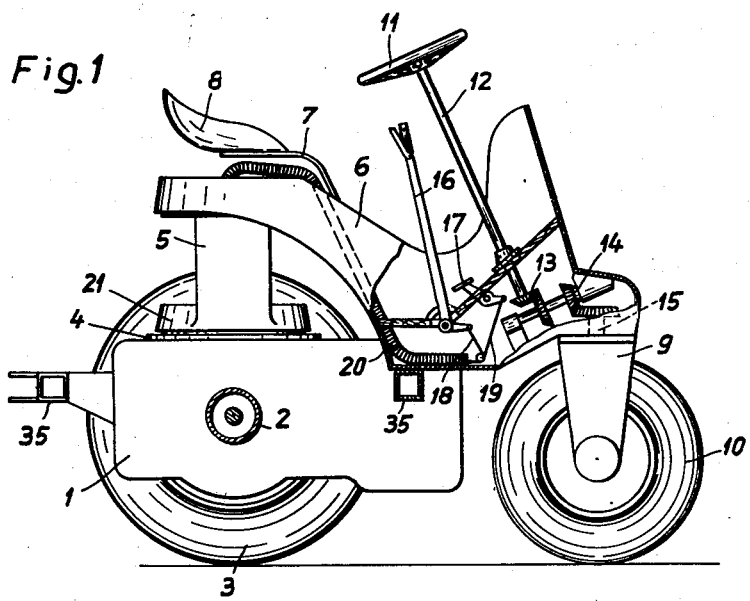

Aug. 19, 1952  H. LOMMEL  2,607,432
TRACTOR

Filed Sept. 15, 1949  2 SHEETS—SHEET 1

INVENTOR
HELMUT LOMMEL
by Walter S. Bleston
ATTORNEY

Aug. 19, 1952  H. LOMMEL  2,607,432
TRACTOR
Filed Sept. 15, 1949  2 SHEETS—SHEET 2
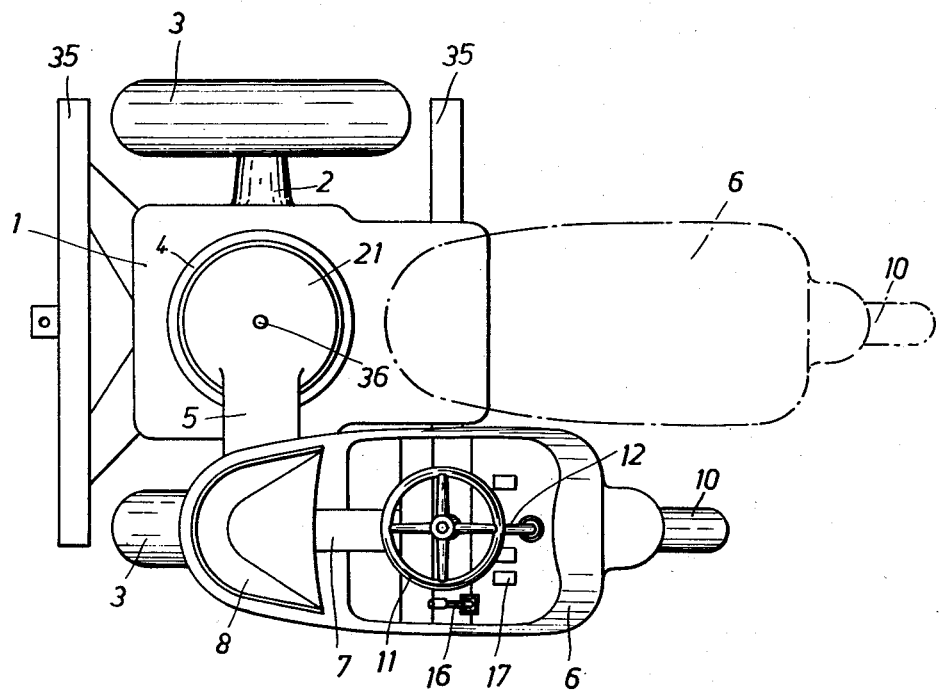
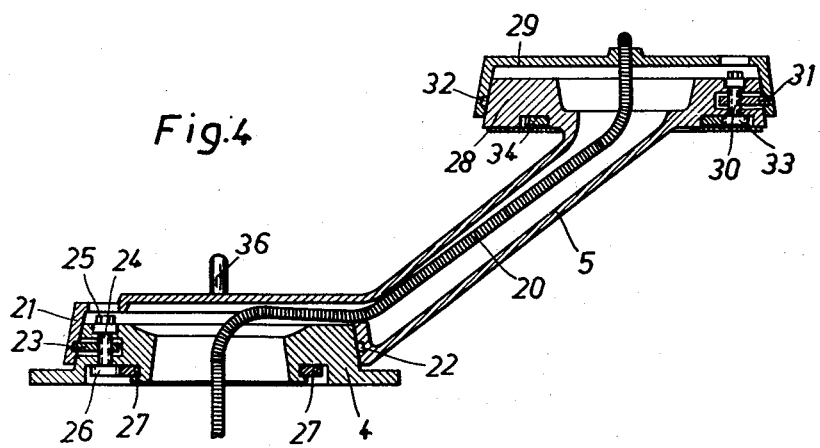
INVENTOR
HELMUT LOMMEL
by Walter S. Bleston
ATTORNEY Patented Aug. 19, 1952

2,607,432

UNITED STATES PATENT OFFICE 2,607,432

TRACTOR

Helmut Lommel, Beuerberg, near Wolfratshausen, Upper Bavaria, Germany

Application September 15, 1949, Serial No. 115,841
In Germany July 8, 1949

3 Claims. (Cl. 180—27)

The invention relates to certain improvements in the arrangement and design of the driver's seat in tractors, more particularly tractors serving for the cultivation or tilling of the soil.

It is an object of the invention to provide means by which the connection of working machines or operators, e. g., agricultural machines or other appliances and implements to tractors can be simplified and well arranged, so that the implement when operating is disposed in a favorable position in the field of vision of the driver.

According to the invention this is attained in such a way that the driver's seat is adjustable from the central longitudinal axis of the tractor towards both sides approximately by the track gauge. In a preferred form of the invention the driver's seat is moreover swingable through 180° for driving the vehicle in opposite directions.

In a preferred practical embodiment of the invention, the driver's seat is carried by a horizontally swivelling arm which is pivotally mounted approximately above the center of the driving axle of the tractor. The driver's seat is in this case rotatably arranged on the end of the swivelling arm. Advantageously, the adjustable seat is supported by a steering wheel mounted at the same.

Other and further objects, features and advantages of the invention will be pointed out hereinafter and appear in the appended claims forming part of the application.

In the accompanying drawings a now preferred embodiment of the invention is shown by way of illustration and not by way of limitation.

Figure 2:
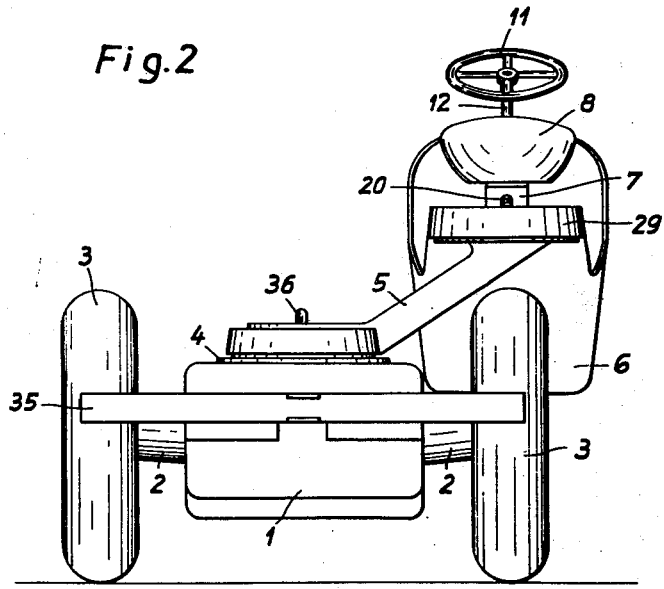

In the drawings:

Fig. 1 is a side view of a tractor having the invention applied thereto, one driving wheel being taken off, Fig. 2 is a rear view thereof, Fig. 3 is a plan view thereof, Fig. 4 is a vertical section through the swivelling arm and the bearings arranged at the two opposite ends thereof.

Similar reference numerals denote similar parts in the different views.

Referring now to the drawings in greater detail, it will be seen that the driving axle 2 of the two driving wheels 3 of the tractor is mounted on the engine casing 1 which is advantageously designed in the form of a flat block and has secured to it, approximately above the driving axle 2, a pivot 4 for a swivelling arm 5 which is swingable in a horizontal plane.

Mounted at the outer end of arm 5 is the driver's cockpit 6 which is also rotatable and fixable and comprises above its bearing on the arm 5 the seat 8 mounted on a plate spring 7, while the opposite end of the cockpit 6 is supported on the steering wheel 10 by means of a fork member 9 and accommodates the appertaining steering device comprising a hand wheel 11, the steering column 12 and pairs of bevel wheels 13 and 14 which act upon the shaft 15 of the front wheel fork 9.

In the embodiment as illustrated in the drawings the motions of the other operating levers required for operating the vehicle, e. g., the hand brake 16 and the foot brake 17 (Fig. 3), are transmitted to the driving elements of the vehicle from the adjustable driver's cockpit 6 with the aid of Bowden cables 18 and 19 which are enclosed in a flexible metal hose 20 guided through the hollow swivelling arm 5. By way of alternative, the motion of the operating levers could also be transmitted from the driver's cockpit in any other way, e. g., by hydraulic means or by electric devices operating with the aid of sliding contacts.

In order to adjust and lock the driver's cockpit a device like that shown in Fig. 4 may be provided. The pivot 4 rigidly secured on the casing 1 of the engine block is conically shaped at its circumference. The cup-shaped lower rim 21 of the swivelling arm 5 forms at its inside a corresponding conical contact surface provided with an annular groove 22 into which engage clamping members 23 distributed over the circumference and mounted on spindles 24 in the pivot 4. The upper ends of the spindles 24 are shaped as hexagonal heads 25 while on the lower ends of the spindles toothed wheels 26 are secured which mesh with a toothed rim 27 rotatably mounted in an annular groove of the pivot 4. If any of the spindles 24 are turned by means of a crank (not shown) put on its hexagonal end 25, this rotation will be transmitted to the other spindles 24 through the toothed wheel 26 of the urned spindle and the toothed rim 27, so that the clamping members 23 distributed over the circumference are uniformly tightened.

The bearing for the cockpit 6 at the upper end of the swivelling arm 5 may be designed in a similar way. In this case the pivot 28 is rigidly connected with the arm 5 and the cup member 29 overlying the conical edge of the pivot 28 is secured to the cockpit 6. By turning the spindles 30 the clamping members 31 are moved which engage in the annular groove 32 of the cup-shaped bearing member 29. Owing to the engagement of their toothed wheels 33 in the toothed rim 34 all of the spindles 30 distributed over the circumference are rotated in unison.

Provided on the engine block 1 are four bracket members 35 for alternative support of the driver's cockpit 6 depending on its actual lateral position. On the cup-shaped part 21 of the bearing 4 is provided a trunnion or journal 36 for attaching trailer vehicles or working machines.

My invention permits moving the driver's seat from the middle position shown in Fig. 3 in dotted lines, which may be adjusted, e. g., when dragging a trailer, either to the right or to the left hand side into a position situated, for instance, in the track of the driving wheels, as shown in full lines in Fig. 3. This position is particularly suitable for attaching to the front side of the tractor even large working machines, since their operation can be surveyed very well from the driver's seat. If it is intended to drive the tractor in an opposite direction, it is easily possible to turn the laterally swung out cockpit through 180°. In this case working machines can be attached at the rear side of the tractor which can be surveyed very well from the driver's seat.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a tractor, a body, a pair of coaxial traction wheels journaled in said body, a pivot located above the center of the axis of said wheels, an arm mounted with one of its ends on said pivot, the other arm end portion being on a level above said wheels so that said arm can be freely swiveled with said other end selectively into any position in which said other end is substantially in the plane of one of said wheels, means to secure said arm in the selected position, a driver's seat including a supporting structure, said structure being pivoted to said other arm end so that said seat can face either direction lengthwise of said body, a road steering wheel pivoted to said structure, and a steering gear for said steering wheel mounted on said structure.

2. A tractor as claimed in claim 1 wherein the length of said arm between its pivots is substantially equal to half the track gauge of said traction wheels.

3. A tractor comprising a chassis, including a pair of traction wheels, said chassis being symmetrical with respect to a longitudinal axis and to a transverse axis, a pivot in the center of said chassis, an arm mounted with one of its ends on said pivot, the other arm end portion being on a level above said wheels so that said other arm end can be selectively adjusted in any position in the plane of either one of said traction wheels, a cockpit including a driver's seat and being pivoted to the other arm end so that said cockpit can be turned with said seat to face either longitudinal direction in any position of said arm, a road steering wheel pivoted to said cockpit, and a steering mechanism within said cockpit and operative from said seat to turn said road steering wheel relatively to said cockpit.

HELMUT LOMMEL.

REFERENCES CITED

The following references are of record in the file of this patent:

UNITED STATES PATENTS

| Number | Name | Date |
| --- | --- | --- |
| 948,317 | Fuller | Feb. 8, 1910 |
| 1,321,107 | Kidney | Nov. 11, 1919 |
| 1,463,097 | Schneider | July 24, 1923 |
| 2,384,890 | Coldwell | Sept. 18, 1945 |

FOREIGN PATENTS

| Number | Country | Date |
| --- | --- | --- |
| 399,791 | France | May 3, 1909 |
| 725,871 | France | Feb. 22, 1932 |